(12) United States Patent
Dietrich

(10) Patent No.: US 6,715,844 B2
(45) Date of Patent: Apr. 6, 2004

(54) TENSIONED SPOKED BICYCLE WHEEL ASSEMBLY AND METHOD FOR CONNECTING A SPOKE AND RIM THEREIN

(76) Inventor: Rolf Dietrich, 4631 Shadowood, Toledo, OH (US) 43614

( * ) Notice: Subject to any disclaimer, the term of this patent is extended or adjusted under 35 U.S.C. 154(b) by 0 days.

(21) Appl. No.: 10/328,106

(22) Filed: Dec. 23, 2002

(65) Prior Publication Data

US 2003/0090141 A1 May 15, 2003

Related U.S. Application Data

(63) Continuation-in-part of application No. 10/262,312, filed on Sep. 30, 2002, and a continuation-in-part of application No. 09/744,848, filed as application No. PCT/US99/17175 on Jul. 29, 1999, now Pat. No. 6,497,042.
(60) Provisional application No. 60/094,512, filed on Jul. 29, 1998, and provisional application No. 60/325,826, filed on Sep. 28, 2001.

(51) Int. Cl.$^7$ .............................................. B60B 21/06
(52) U.S. Cl. ..................................... 301/58; 301/95.107
(58) Field of Search .............................. 301/55, 58, 61, 301/95.104, 95.106, 104, 73, 95.107, 57; 29/894.33

(56) References Cited

U.S. PATENT DOCUMENTS 4,583,787 A     4/1986   Michelotti
5,931,544 A  *  8/1999   Dietrich ........................ 301/58
6,036,279 A  *  3/2000   Campagnolo ................. 301/55
6,070,948 A  *  6/2000   Chen ...................... 301/95.104
6,186,598 B1 *  2/2001   Chen ............................ 301/58
6,293,629 B1 *  9/2001   Chen ............................ 301/58
6,402,256 B1    6/2002   Mercat
6,497,042 B1 * 12/2002   Dietrich ................. 29/894.333

FOREIGN PATENT DOCUMENTS

EP           0715001          10/1995

* cited by examiner

Primary Examiner—Russell D. Stormer
(74) Attorney, Agent, or Firm—David C. Purdue; John C. Purdue

(57) ABSTRACT

An improved tensioned spoke bicycle wheel. The wheel comprises a hub, a rim, spokes and spoke nipples. A spoke that is connected to the left side of the hub is paired, at the rim, with a spoke that is connected to the right side of the hub. For each pair of spokes, there is provided a spoke plate that is positioned between the rim floor and the nipples. Each of the spokes in a pair extends through adjacent spoke bores in the rim, through spoke bores in the spoke plate and into the spoke nipples. The spoke plates distribute the forces associated with the tensioned spokes over a substantial portion of the rim floor. The spoke plate may have a flat surface where it supports the nipples or a socket shaped surface. In the latter case, the nipples have a ball shaped lower end that seat in the socket.

12 Claims, 10 Drawing Sheets

TENSIONED SPOKED BICYCLE WHEEL ASSEMBLY AND METHOD FOR CONNECTING A SPOKE AND RIM THEREIN

REFERENCE TO RELATED APPLICATIONS

This is a continuation in part of application Ser. No. 09/744,848, now U.S. Pat. No. 6,497,042, which was, in turn, the U.S. national stage of international patent application No. PCT/US99/17175 filed Jul. 29, 1999. This is also a continuation in part of U.S. patent application Ser. No. 10/262,312 filed Sep. 30, 2002.

BACKGROUND OF THE INVENTION

1. Field of the Invention

The present invention relates generally to bicycle type wheels and especially to such wheels including tensioned spokes connecting a rim to a hub. More specifically, the invention relates to front and rear, radially and tangentially laced, tensioned spoke wheels comprising a hub, a rim and a plurality of spokes connecting the rim to the hub, and a mechanism for attaching the spokes at the rim to reduce spoke stresses and breakage and/or rim stresses.

2. Description of the Prior Art

Spoked wheels, especially for bicycles, are laced generally in one of two spoking patterns. Radially spoked wheels, with spokes extending generally radially outwardly from hub flanges, are used as front wheels for bicycles. Tangentially spoked wheels, with spokes extending tangentially or nearly so, relative to the hub flanges, are used as rear bicycle wheels. In both cases, the longitudinal axis of a spoke deviates from a radial orientation relative to the intersection of the center plane of the wheel and the rotational axis of the wheel. This is illustrated in FIGS. 5 and 6, which are based upon FIGS. 2 and 1, respectively, of U.S. Pat. No. 4,583,787 ("Michelotti"), the disclosure of which is incorporated herein by reference.

FIG. 5 illustrates what we will call the centering angle of a spoke, in the context of a rim 10 which has a radius R. In the drawing, the radius R coincides with the center plane of a wheel including the rim 10, the center plane being perpendicular to the axis of rotation of the wheel and intersecting the center line of the rim. The longitudinal axis, designated SA, of a spoke (not shown) attached to a left hub flange (not shown) deviates from the rim radius R by an angle designated CA for centering angle. In the drawing, the spoke axis SA intersects the rim radius R outside of the rim 10. Because of this deviation, a spoke connected to the rim 10 and a left hub flange (not shown) exerts a lateral force which is balanced, more or less, depending on the spoking pattern, by an opposite lateral force exerted by a spoke (not shown) connected to the rim 10 and a right hub flange (not shown). These lateral forces keep the rim centered in the wheel center plane and provide essential lateral stability to radially spoked wheels and to tangentially spoked wheels. Thus, the name centering angle.

FIG. 6 illustrates what we will call the torsional angle of a spoke, in the context of a rim 12 which has a radius R. In the drawing, the radius R coincides with the center plane of a wheel including the rim 12, the center plane being perpendicular to the axis of rotation of the wheel and intersecting the center line of the rim 12. The longitudinal axis, designated SA, of a spoke 14 attached to a right or left hub flange (not shown) deviates from the rim radius R by an angle designated TA for torsional angle. Because of this deviation, which is found in tangentially spoked wheels, primarily used as rear driving wheels, the spoke is operable to transmit a pulling or torsional force from a rotating hub to the rim 12, tending to cause the rim to rotate. Thus, the name torsional angle. Generally speaking, there is no torsional angle in wheels which are radially spoked.

If it were not for the torsional and centering angles of spokes, securing them to a rim would be a fairly simple matter. It is, however, a complicated matter to secure spokes to a rim. This is further complicated because the centering angle and the torsional angle are not constant in bicycle wheels on a moving bicycle. The weight of a rider, forces associated with turning, forces associated with braking and forces associated with acceleration, among other things, can and do cause small but not insignificant changes in these angles and these changes occur very rapidly during cycling. These angle changes cause stresses in spokes, particularly where they are fastened to the rim, typically by internally threaded nipples. Various attempts to deal with these stresses are discussed below.

The Michelotti patent discloses a bush which is received in a spoke bore in a rim. The bush is configured with two cylindrical co-axial bodies for receiving the conical head and the cylindrical section of an internally threaded nipple which receives the threaded end of a spoke. The bush is further configured to minimize deviation between the common axes of the cylindrical bodies and the longitudinal axis of the spoke. Apart from difficulties associated with properly orienting the bushes to achieve the desired result, this approach does not begin to account for dynamic changes in the centering angle and the torsional angle.

Another prior art method is illustrated in FIG. 2 which shows a rim 20, in cross-section and a spoke 22 connected to the rim 20. The rim 20 has a rounded spoke bed indicated at 24 which is raised, as indicated at 26, adjacent to sidewalls 28 of the rim 20, and lower in the middle, as indicated at 30. A spoke bore, indicated at 32, has an axis which is oriented, so far as possible, to coincide with the longitudinal axis of the spoke 22, taking into account the centering angle as well as the torsional angle, if any, of the spoke 22. A nipple 34 is internally threaded and is attached to a threaded end 36 of the spoke 22. Portions of the bottom end 38 of the nipple 34 engage the rounded rim floor 24 while other portions of the bottom 38 of the nipple 34 do not engage the rim floor 24. This condition is exacerbated under dynamic conditions when the centering angle and the torsional angle are changing. The resulting stresses tend to concentrate in the unthreaded portion of the spoke 22, immediately adjacent to the threaded portion 36.

Referring now to FIGS. 3 and 4, an extended nipple 40, similar to the nipple shown in the Michelotti patent with a head 6, has a head 42 which is seated on a substantially flat rim floor 44 of a rim 45. As can be seen in FIG. 4, however, only a small portion of the underside 46 of the head 42 of the nipple 40 seats against the rim floor when it engages a spoke 47 extending through the rim 45. In this arrangement, the spoke hole, indicated at 48, is inclined so that its axis coincides generally with the longitudinal axis of the spoke, taking into account the centering angle and, if necessary, the torsional angle. The nipple 40 has a slot, indicated at 49 in FIG. 4, which is engageable by a screwdriver or the like to properly tension the spoke 47.

Bicycle wheel rims encounter large stresses at spoke locations. Typically, a spoke extends through a spoke hole in the rim and is connected inside of the rim to an internally threaded nipple. Low spoke count wheels, i.e., in the range of 14 or 16 spokes up to 20 or 24 spoke wheels have higher spoke tensions than conventional wheels with 28 or more spokes. Consequently, low spoke wheels have a higher stress concentration where the spokes are connected to the rim than conventional wheels because each spoke must carry a higher load when there are fewer spokes so that the total tension in the spokes which centers the rim and the hub within the rim is about the same as in a higher spoke wheel. Some have undertaken to reinforce and/or reduce rim weight while providing adequate strength at spoke connection points, in rather remarkable ways. EP 0 715 001 A1 discloses the idea of extruding a rim section having a spoke bed of a given thickness, masking spoke connection points and chemically removing material from the rim except under the masks, resulting in a rim with thickened portions coinciding with spoke connection points and reduced thicknesses elsewhere on the rim. U.S. Pat. No. 6,402,256 B1 discloses a rim that is made from a rim section having a spoke bed with a given thickness and the mechanical removal of spoke bed material in between the spoke connection points. This produces a rim that is reinforced at spoke connection points.

SUMMARY OF THE INVENTION

The present invention is based upon the discovery of an improved method for attaching a threaded end of a spoke to a rim and a wheel made in accordance with the method. According to the method, a rim, preferably one having a substantially flat rim floor, is provided with spoke bores that are oriented so that the axis of the bore coincides or is substantially parallel to a radius of the wheel. The threaded end of the spoke is inserted through the spoke bore, a cylindrical spacer element is positioned around the spoke end and an internally threaded nipple is attached to the threaded portion of the spoke end. According to the method, the spacer height is controlled, relative to the stiffness of the spoke, so that, when the spoke is tightened, the threaded portion and an unthreaded portion adjacent thereto coincide with or are substantially parallel to a radius of the wheel and so that a bend is formed in the spoke, as it is tightened, to accommodate centering angle and, if necessary, the torsional angle. The bend is formed in the spoke at a point which is remote from the transition between the threaded portion of the spoke and the adjacent, unthreaded spoke portion. Preferably, the bend is formed at or near a point on the spoke, adjacent to point where the spoke exits the underside of the rim. This arrangement moves stresses of the type described above, away from the transition between the threaded portion of the spoke and the unthreaded portion of the spoke, while providing for a firm, stable support between the underside of the nipple and the spoke bed with good distribution of tensile stresses on the rim floor.

In a preferred embodiment of a wheel according to the present invention, a spoke from the left side of the hub flange is paired, at the rim, with a spoke from the right side of the hub flange, and a spacer comprising a spoke plate is positioned between the spoke bed and the nipples, inside of the rim. The length of the spoke plate is greater than the distance between the spokes of a pair, at the rim, and coaction between the spoke plates and the nipples, on the one hand, and between the spoke plate and the rim spoke bed, on the other hand, distributes the load associated with the tensioned spokes over a substantial portion of the spoke bed, thereby eliminating the high pressure point loading of the spoke bed around each spoke hole and eliminating the need to reinforce or bolster the spoke bed at spoke connection points through chemical or mechanical means. Advantages accrue with the use of a spoke plate even if it does not result in a bend in the spoke remote from the thread onset. In one embodiment, the spoke holes in the spoke plate are surrounded with a socket shaped depression and the end of a nipple that engages the spoke plate is rounded as a ball so that the nipple aligns itself with the spoke, greatly reducing stresses in the spoke under dynamic conditions.

Accordingly, it is an object of the present invention to provide a method for connecting a spoke to a rim which will reduce stresses found in prior art wheels adjacent to the intersection of the threaded end portion of the spoke and the adjacent, unthreaded portion of the spoke.

It is an object of the present invention to provide a method for connecting a spoke to a rim which will reduce stresses found in rims of prior art wheels adjacent to the spoke.

It is a further object of the invention to provide a method for securing a spoke to a rim with a nipple so that the underside of the spoke nipple is firmly supported relative to the rim floor.

It is a further object of this invention to provide a wheel which resists failure due to bending of the spoke adjacent to the intersection between the threaded end portion of the spoke and the adjacent unthreaded portion.

It is yet another object of the invention to provide a wheel in which an end portion of the spoke is oriented so that its longitudinal axis coincides with or is substantially parallel to a radius of the wheel and there is a bend in a portion of the spoke at a point which is remote from the intersection between the threaded portion of the spoke and the adjacent unthreaded portion.

It is a primary object of this invention to provide an improved spoked wheel.

These and other objects and advantages of the present invention will no doubt become apparent to those skilled in the art after having read this detailed description of the invention including the following description of the preferred embodiment which is illustrated by the various figures of the drawing.

DETAILED DESCRIPTION OF THE PREFERRED EMBODIMENTS

Figure 1:
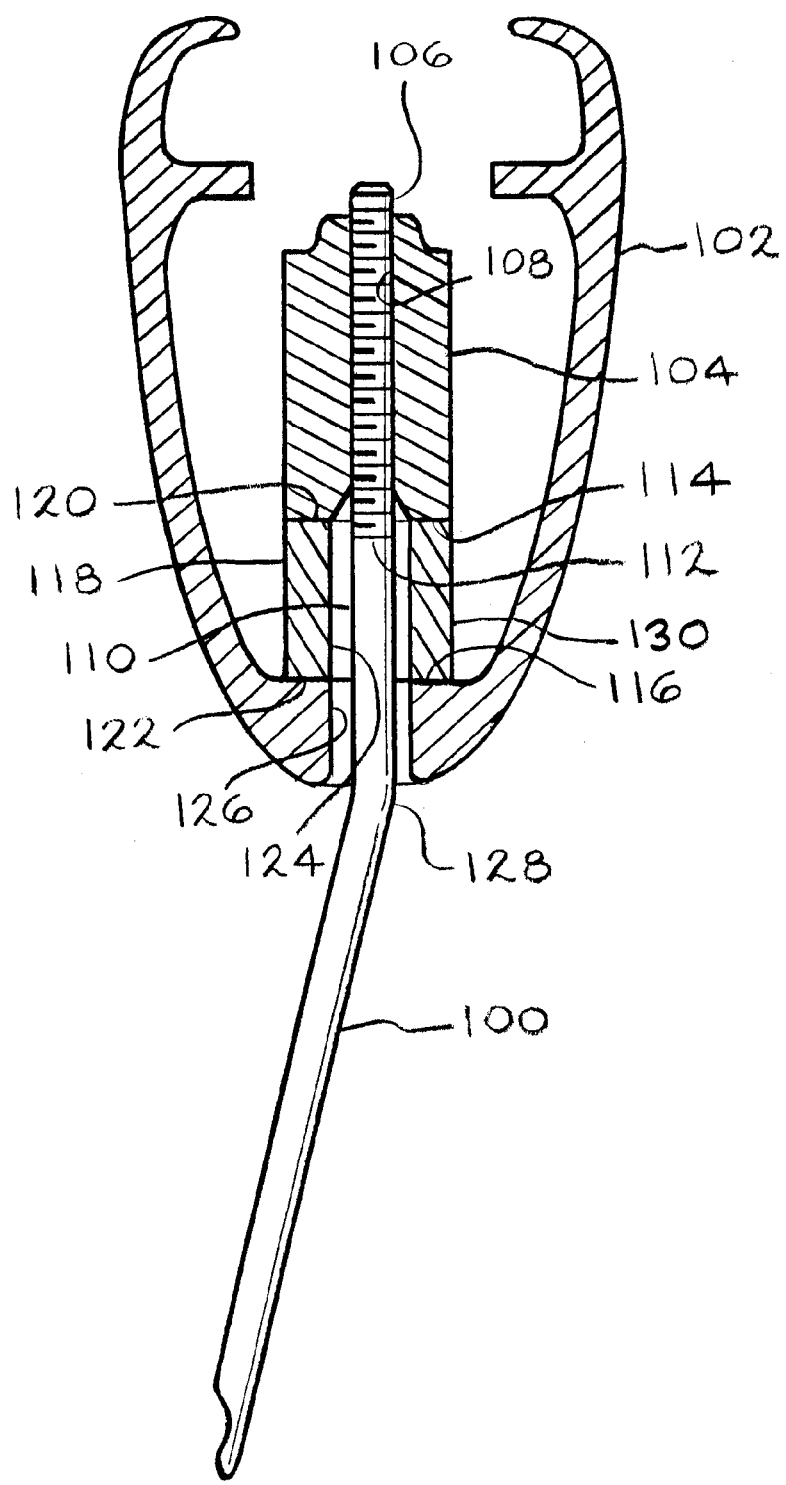
FIG. 1 is a view, partially in cross-section, of a portion of a rim section including a spoke and rim connection according to the present invention.
Figure 2:
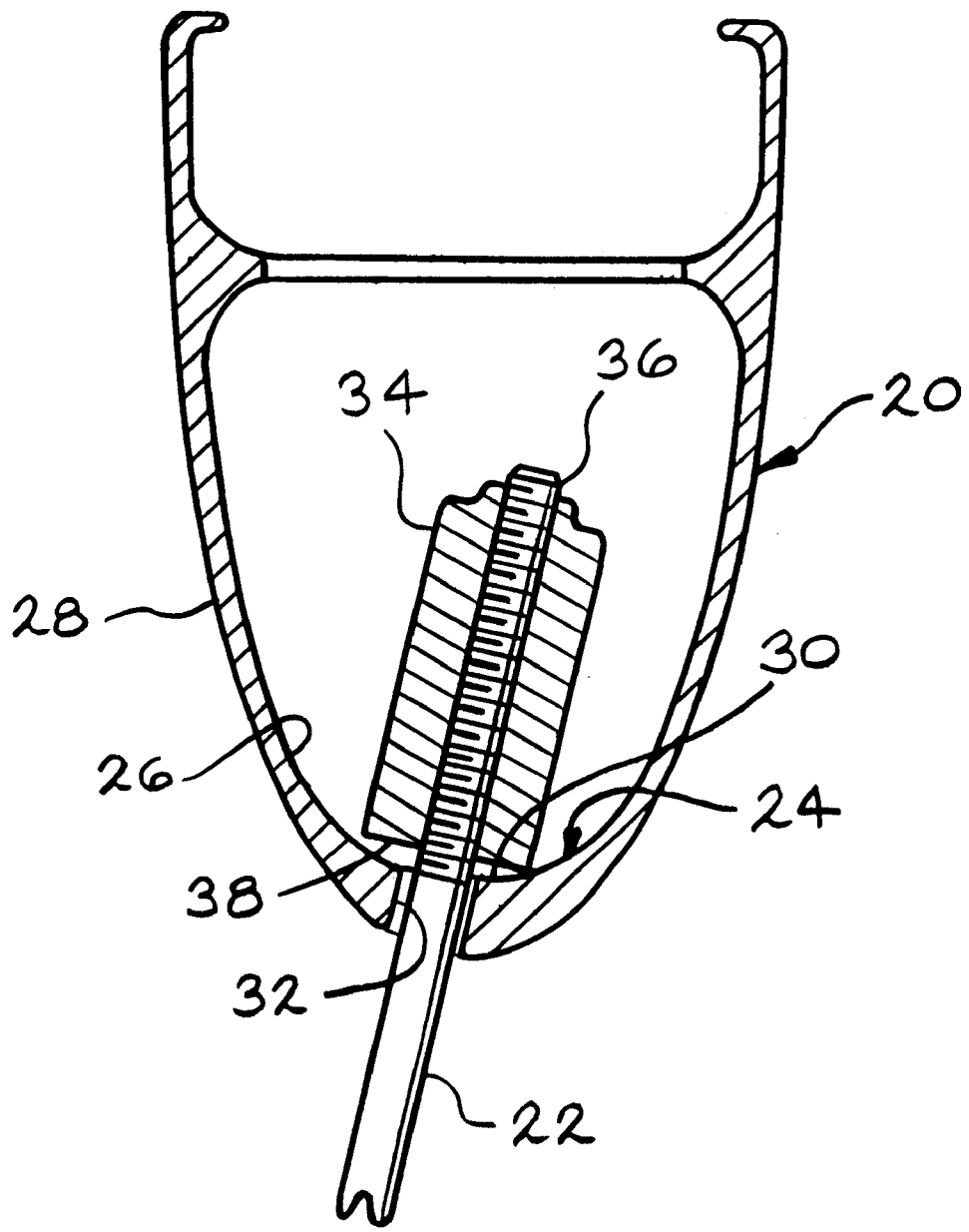
FIG. 2 is a view, partially in cross-section, of a rim section showing a prior art spoke and rim connection.
Figure 3:
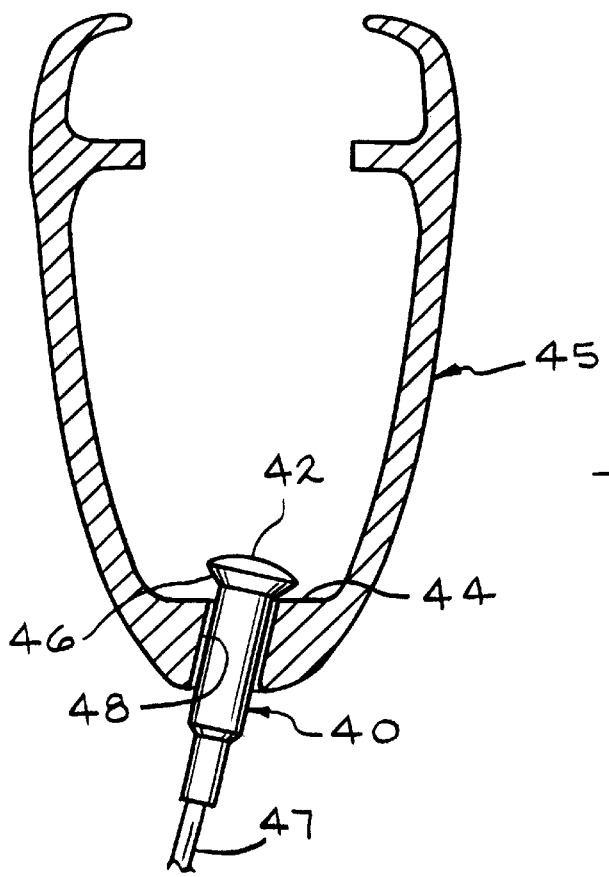
FIG. 3 is a cross-sectional view of a rim section showing a prior art spoke and rim connection.
Figure 4:
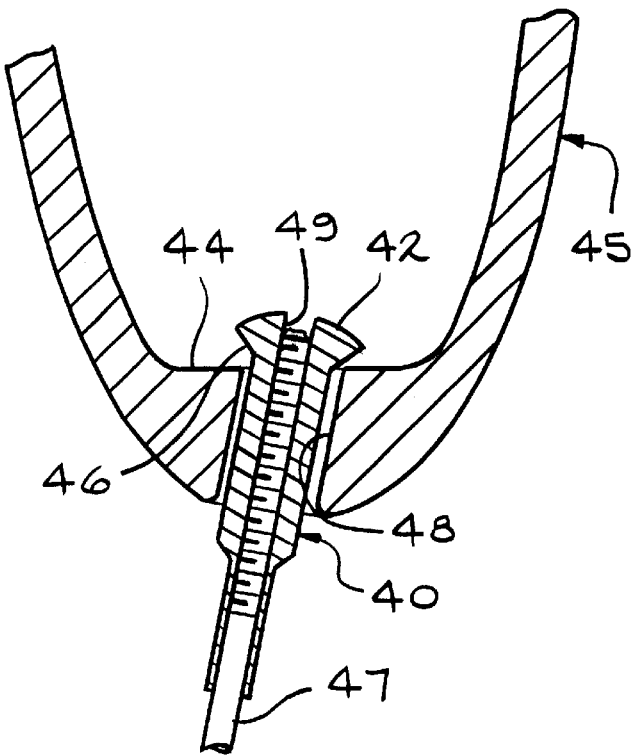
FIG. 4 is a cross-sectional view of a rim section showing a prior art spoke and rim connection.
Figure 5:
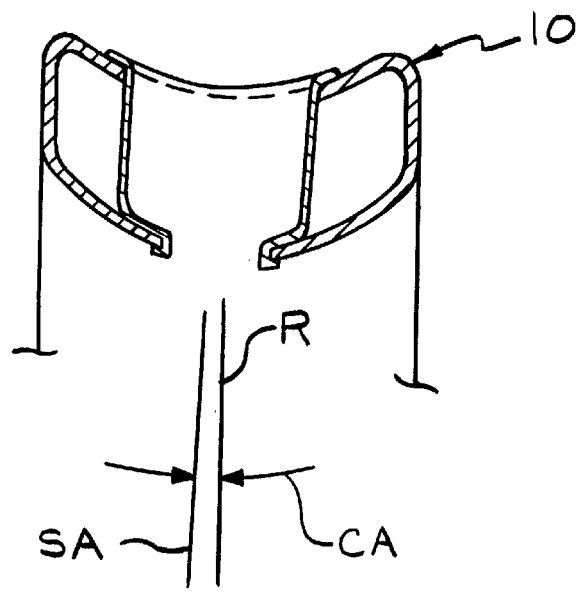
FIG. 5 is a modified version of FIG. 2 of the Michelotti patent, illustrating the centering angle of a spoke.
Figure 6:
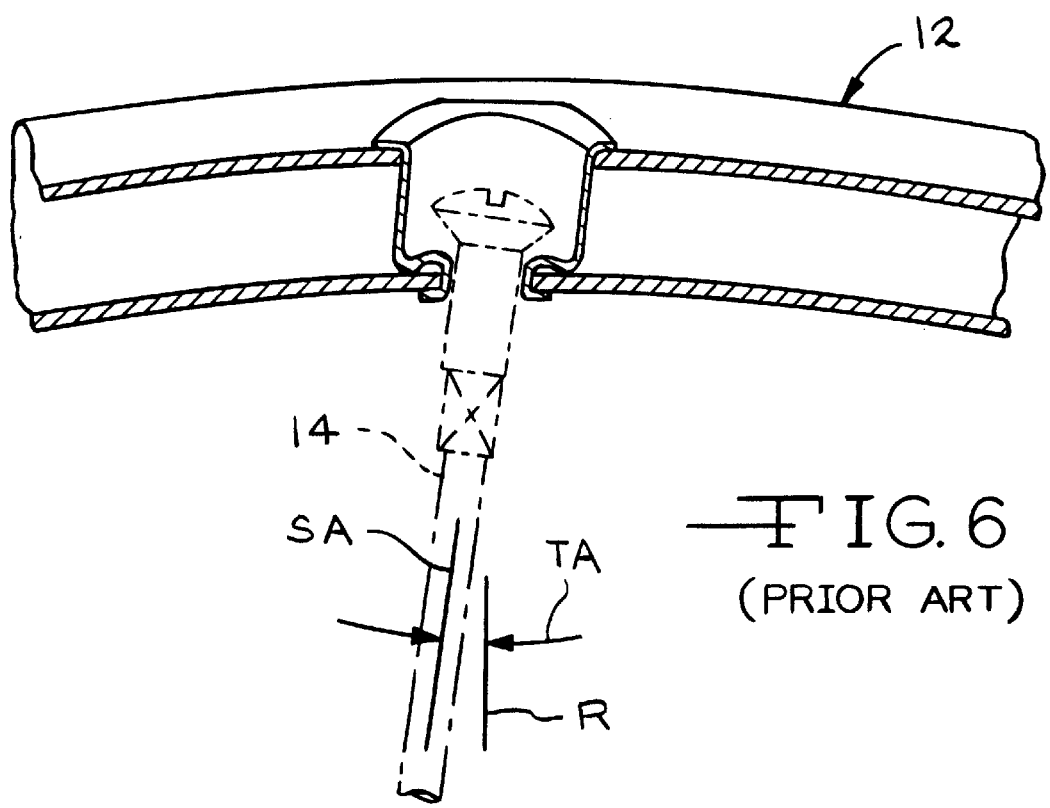
FIG. 6 is a modified version of FIG. 1 of the Michelotti patent, illustrating the torsional angle of a spoke.

Referring to FIG. 1, a spoke 100 is shown connected to a rim 102 by a nipple 104. An end portion 106 of the spoke 100 is threaded and is received in an internally threaded bore, indicated at 108, in the nipple 104. The outer surface of the nipple may have four or six sides or flats (not shown) engageable by a wrench, although other torque transmitting configurations may certainly be employed. Preferably, there is a locking feature incorporated in the bore 108 of the nipple 104 which serves to lock the nipple 104 to the spoke 100 so that the nipple will not turn relative to the spoke. This feature in the art is known generally as a locking nut.

Adjacent to the threaded portion 106 of the spoke 100, there is an unthreaded portion 110 of the spoke 100. The intersection between the threaded portion 106 and the unthreaded portion 110 is indicated by the reference numeral 112. Generally, wheels are designed so that the intersection 112 is adjacent to an underside 114 of the nipple 104 when the spoke is at final tension.

The rim has a substantially flat rim floor, indicated at 116 although it will certainly be appreciated that the floor bed is actually a surface of revolution. However, because radius of the rim floor is relatively large, especially compared to the size of the nipple, the rim floor 116 may be considered substantially flat for present purposes.

Between the underside 114 of the nipple 104 and the rim floor 116, there is a spacer element 118. It is basically a right cylinder with a flat end 120 which abuts the underside 114 of the nipple and a flat end 122 which abuts the rim floor 116. The abutment occurs when the spoke 100 is tightened, along with other spokes in the wheel, to produce a finished wheel. These tensions may be quite high, as in the case of a low spoke count wheel having, for example, 16 or so spokes. The spacer 118 has an internal bore, indicated at 124, which has an axis which is perpendicular to the surfaces 120 and 122. The bore 124 is slightly larger in diameter than the unthreaded portion 110 of the spoke 100, so that the spoke is easily received in the bore 124. Generally speaking, the diameter of the bore 124 should be about one tenth of all inch larger than the diameter of the spoke portion received therein.

The unthreaded portion 110 of the spoke 100 extends through the spacer 118 and through a spoke bore, indicated at 126, through the rim. When the spoke 100 is tightened, as by turning the nipple 104, the threaded portion 106 and the adjacent unthreaded portion 110 of the spoke 100, remain substantially straight down to a bend 128 in the spoke, which occurs in the spoke at or near the point where the spoke 100 exits the underside of the rim 102. The outer portion of the spoke, above the bend 128, remains substantially straight and coincides with or is substantially parallel to a radius of the rim 102. The inner portion of the spoke 100, below the bend 128, has a longitudinal axis which coincides with the centering angle and, if necessary, the torsional angle of the wheel, as measured from the bend 128. The height of the spacer 118 is a few millimeters and various heights will work in the method of this invention. The height must be such that, when the spoke is tightened, it will bend at a point coinciding with or adjacent to the bend 128, remote from the intersection 112 of the threaded portion 106 and the unthreaded portion 112. Excellent results have been achieved with two spacers having a combined height of 5 millimeters. The spacer height might have to be lower or higher, depending upon the stiffness of the spoke. It will be appreciated that a two piece or multiple piece spacer could be substituted for the single spacer 118, provided that the pieces have an appropriate combined height. Essentially, the spacer 118 has an upper surface 120 and lower surface 122 which are parallel to each other and a spoke bore 124 having a longitudinal axis which is substantially perpendicular to the surfaces 120 and 122. The spacer 118 is illustrated as having an outer surface 130 which is substantially cylindrical although it may have other configurations and still perform in accordance with the present invention.

It will be appreciated that, when the spoke 100 is attached to the rim 102 in accordance with the method of the present invention, the spoke 100 is forced to bend, as it is tightened, at about the point where it exits the spoke bore 126 in the rim. Because the longitudinal axes of the nipple 104, the spacer 118 and the spoke bore 126 coincide with or are substantially parallel to a radius of the wheel, and the upper and lower surfaces 120 and 122 of the spacer are perpendicular to the axes, the lower surface 122 seats squarely on the rim floor 116, providing excellent distribution of the tensile forces to the rim floor angle and, if necessary, the torsional angle, minimizes stresses in the region of the intersection 112 between the threaded portion of the spoke 106 and the unthreaded portion of the spoke 110, and dissipates the stresses caused by dynamic changes in the centering and torsional angles.

Figure 7:
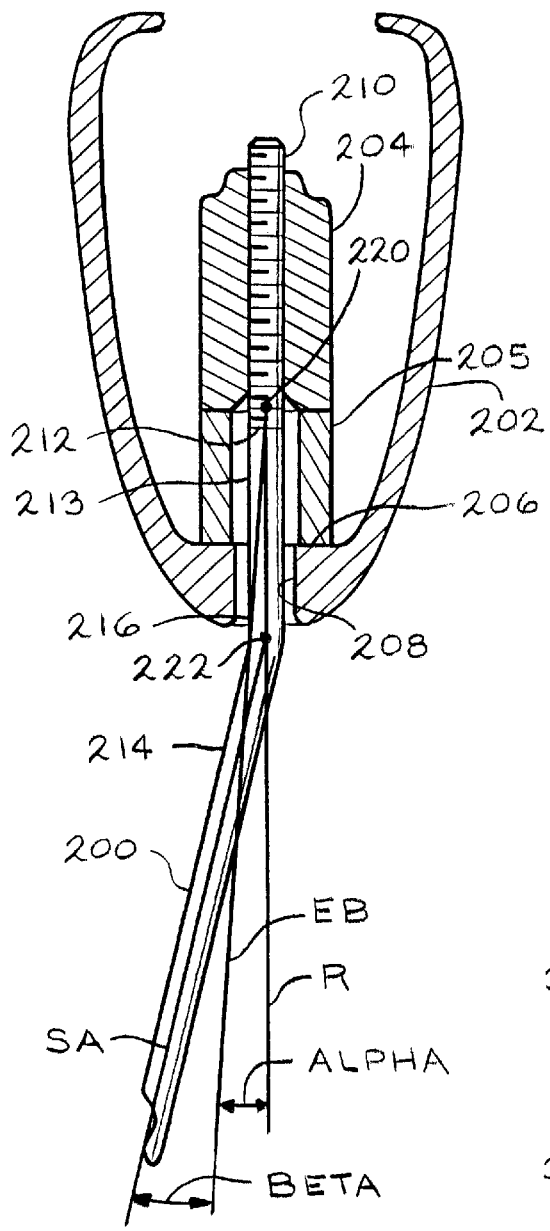
FIG. 7 is a view, partially in cross-section, of a portion of a rim section illustrating further details of a spoke and rim connection according to the present invention.

Referring now to FIG. 7, there is illustrated a spoke and rim connection, according to the present invention, for front and rear wheels. A spoke 200 is attached to a carbon fiber rim 202 by a connector comprising an internally threaded nipple 204 and a spacer 205. It will be appreciated that the connector could be a unitary element rather than two elements as shown in FIG. 7. The rim 202 has a spoke bed 206 and a spoke bore indicated at 208 extending through the rim. A threaded portion 210 of the spoke 200 is received in the nipple 204 and the threaded portion 210 of the spoke 200 terminates, within the rim 202, at a point designated 212 and an unthreaded portion 213 extends down to and through the spoke bore 208 and towards a hub flange (not shown) of a hub. A first portion 214 of the spoke 200 extends from a hub (not shown) to the rim 202 and a second, outer portion of the spoke 200 is constituted by the threaded portion 210 and the unthreaded portion 213. At about a point where the spoke 200 exits the spoke bore, between the first portion 214 and second portion of the spoke 200, there is a bend 216 in the spoke 200. The bend 216 is preferably formed in the spoke 200 during the process of building a wheel including the spoke 200 and other spokes, the rim 202 and a wheel hub (not shown). The formation of the bend 216 will be further explained below in the context of building such a wheel.

A wheel for a bicycle or other human powered vehicle typically comprises a hub with a pair of opposed hub flanges and spoke openings in the hub flanges for receiving a spoke and seating a head on the spoke adjacent to a J-bend provided at a first end of the spoke. A second end of the spoke is typically threaded and, initially, the spoke is straight from the J-bend to the threaded end. The reader may refer to U.S. Pat. No. 5,445,439, the disclosure of which is incorporated herein by reference, for further details concerning human powered vehicle wheels. In building a wheel, one guides the threaded end of each spoke through its spoke opening in the hub flange until the spoke head engages the hub flange. The threaded end of each spoke is then guided through its spoke opening in a rim and an internally threaded nipple or the like is turned to engage a portion of the threaded portion of the spoke until all spokes are roughly in place. Then, the spokes are tightened towards and to a final design tension and, finally, the wheel is trued by individual adjustment of certain ones of the spokes. There are wheel building machines which automate some or all of these steps. As the spokes are tightened, the spoke is elastically deformed so that it takes on a bend where it enters or exits the rim, remote from the threaded portion of the spoke.

Referring again to FIG. 7, in the process of building a wheel including, the threaded end of the spoke 200 is threaded through a hole in a hub flange (not shown), through the spoke bore 208, through the spacer 205 and the nipple 204 is turned onto the threaded portion 210 of the spoke. Co-action between the spoke bed 206 and the connector comprising the nipple 204 and the spacer 205, causes the threaded portion 210 of the spoke 200 to be aligned radially, i.e., along a radius R of the wheel. The first portion of the spoke, between the hub and the rim, will be skewed relative to the axis of the threaded portion 210, to account for the centering angle and, if present, the torsional angle. As a consequence, the spoke 200 will not be straight. As the nipple is tightened towards a final design tension, the spoke 200, will attempt to straighten, tending to cause the spoke to bend, initially, at a point 220 where the spoke exits the nipple 204. This bending will continue until a portion of the spoke 200 engages a portion of the rim which defines the spoke bore 208 (not shown) at which point the axis of the unthreaded portion 213 will be aligned, as indicated at EB, forming an angle, designated alpha, with respect to the radius R of the wheel. This bending does not exceed the elastic limits of the spoke 200 and no permanent bend is imparted to the spoke adjacent the point 220. As the spoke is tightened further, the constrained spoke 200 will tend to bend at a point designated 222 to accommodate the skew between the axis EB of the unthreaded portion 213 and the axis SA of the first portion 214 of the spoke. This bending does exceed the elastic limits of the spoke so that the spoke 200 takes on the permanent bend 216 adjacent the point where the spoke 200 exits the rim 202. The angle beta, between the axis EB of the unthreaded portion 213 and the axis SA of the first portion 214 of the spoke 200, is larger than the angle alpha.

Figure 8:
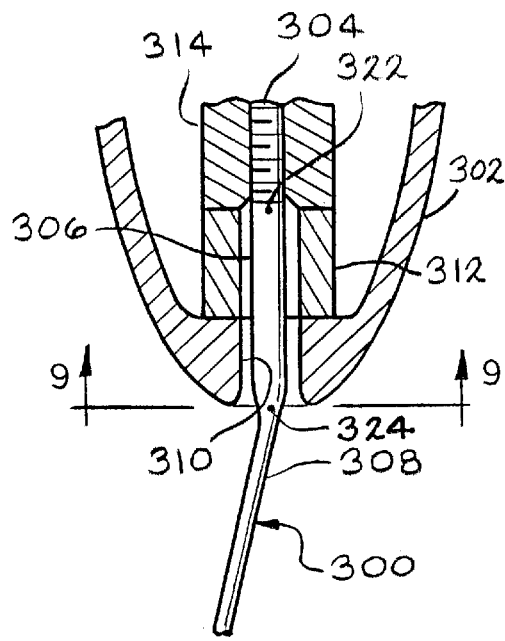
FIG. 8 is a view, partially in cross-section, of a portion of a rim section illustrating a spoke and rim connection, wherein the spoke is a bladed spoke, according to the present invention.
Figure 9:
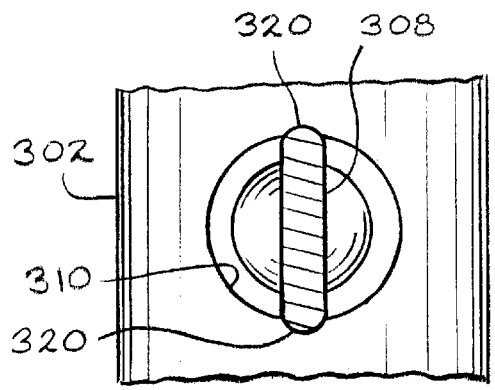
FIG. 9 is a view taken along the line 9—9 of FIG. 8.

Referring now to FIGS. 8 and 9, another embodiment of the invention will now be described. A bladed spoke 300 is corrected to a carbon fiber rim 302. The spoke corresponds with one that is commercially available as a stock DT New Aero spoke. It is stainless steel and has a J-bend (not shown) at one end, a threaded portion 304 at the opposite end, a round, unthreaded portion 306 and a bladed or flat portion 308. A first portion of the spoke 300 extends from a hub (not shown) to the rim 302 and corresponds with the bladed portion 308. A second portion of the spoke 300 comprises the threaded portion 304 and the adjacent, unthreaded portion 306.

Front and rear wheels were produced with the bladed spokes 300, tubular, carbon fiber rims which are commercially available from Lew Composites of Las Vegas, Nev., and front and rear hubs corresponding with the front and rear hubs used in Rolf (trademark) Vector Pro wheels which are commercially available from Trek Bicycle Company. Sixteen spokes were used on the front and rear wheels and the lacing pattern of the spokes corresponded with the lacing pattern of the corresponding Vector Pro wheels. The threaded ends of the spokes 300 were laced through the spoke holes in the hub flanges and then through spoke bores, indicated at 310, through spacers 312 and nipples 314 were turned onto the threaded portions 304 of the spokes 300. Dimensions were controlled so that, as shown in FIG. 9, edges 320 of the bladed portions 308 of the spokes 300 engaged a portion of the wall defining the spoke bore 310. The distance between the two edges exceeded the diameter of the spoke bore 310 by less than one millimeter. Yet, the engagement between the edges 320 and the wall defining the spoke bore 310 prevented lateral movement of the spoke within the bore 310. Accordingly, as the spokes were brought up to wheel design tension, between 200 and 400 pounds per spoke, the spokes did not bend at a point 322 between the threaded portion 304 and the unthreaded portion 306. Instead, the spokes bent at a point 324, right where the edges 320 engaged the wall defining the spoke bore 310.

The front and rear wheels produced as described above were ridden by a two hundred pound rider for 1200 miles with outstanding performance. The rear wheel was further tested on a drum tester comprising a drum which is smooth except for a portion that is raised so that it is three eighths of an inch off of the drum surface, and a fixture for supporting the wheel with a one hundred and fifty pound load applied at the axle, which is equivalent to having a three hundred pound rider. The drum and wheel are rotated to simulate a road speed of 47 miles per hour. The rear wheel racked up 49 hours on the drum test with no spoke failure.

Figure 10:
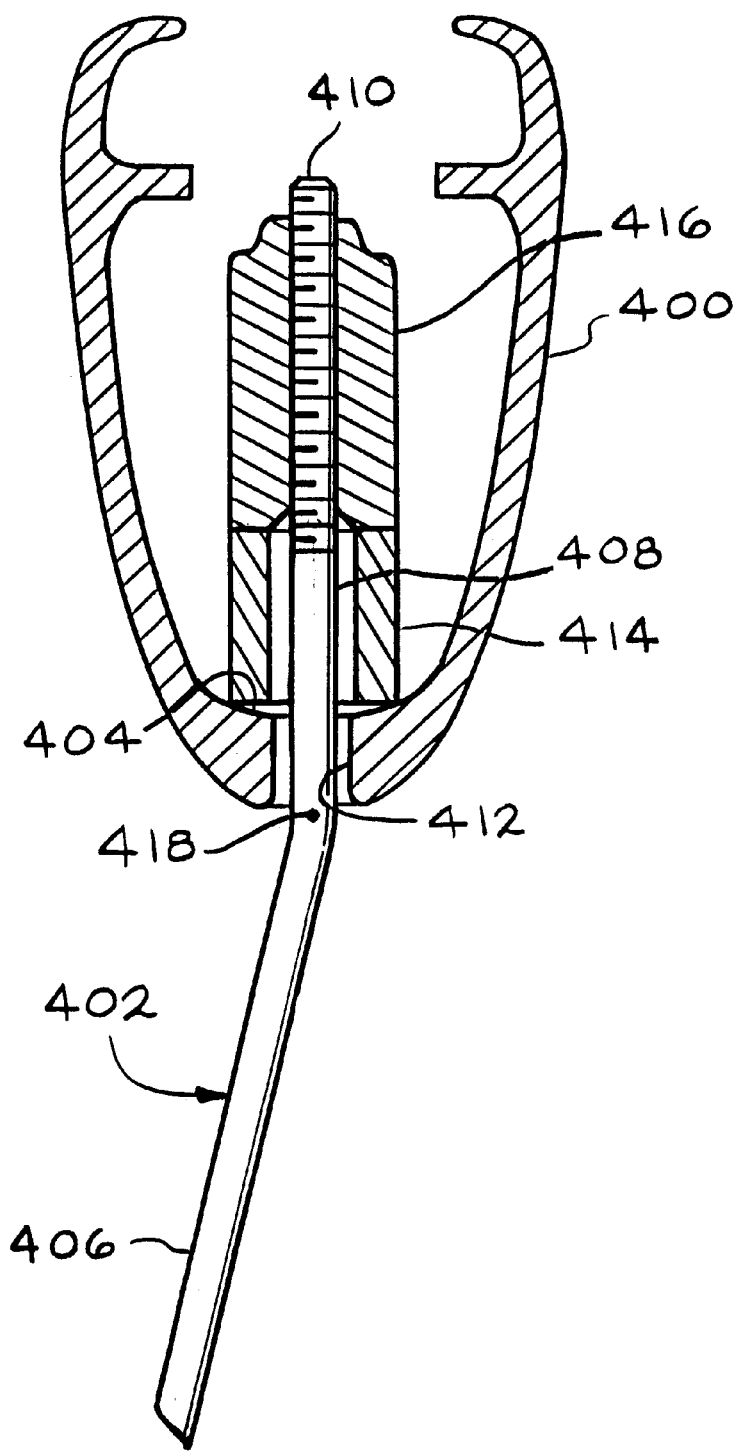
FIG. 10 is a view, partially in cross-section, of a portion of a rim section, including a curved rim floor, showing a spoke and rim connection according to the present invention.

Additional wheels were built according to the present invention from aluminum rims in clincher and tubular styles, but otherwise corresponding with the wheels described above with reference to FIGS. 8 and 9. Referring now to FIG. 10, a clincher rim 400 is illustrated with a bladed or aero type spoke 402 secured to the rim 400. The rim 400 has a rounded spoke bed 404. The spoke 402 comprises a first, bladed portion 406 and a second portion comprising an unthreaded portion 408 and a threaded portion 410. As a wheel is produced including the rim 400, the threaded end 410 of each spoke is first inserted through a hub flange spoke opening, through a spoke bore indicated at 412 in the rim 400, through a spacer 414, and an internally threaded nipple is threaded onto the threaded end 410 of the spoke 402. Edges (not shown) of the bladed portion 406 of the spoke 402 engage a portion of the wall defining the spoke bore indicated at 412, preventing bending of the spoke 402 in the unthreaded portion 408. As the spoke 402 is further tensioned, the spoke elastically deforms causing it to bend at a point 418 between the first, bladed portion 406 and the unthreaded portion 408. A front clincher wheel so produced was tested on the drum tester described above until the rim cracked. The rim was replaced and the wheel was rebuilt with the same spokes. This was repeated six more times until each spoke had racked up 189 hours on the drum tester without a single spoke failure.

Figure 11:
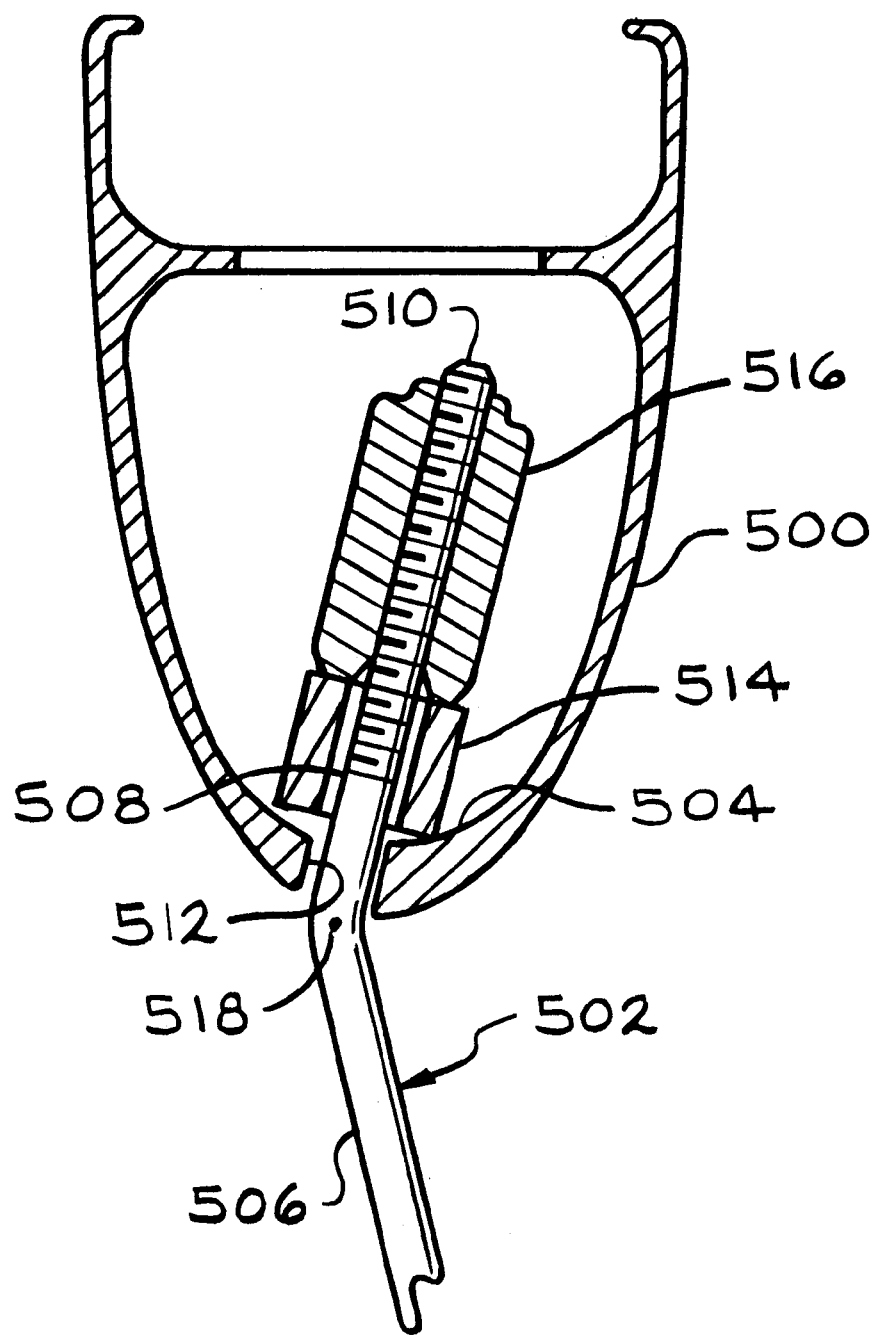
FIG. 11 is a view, partially in cross-section, of a portion of a rim section illustrating a spoke and rim connection according to the present invention wherein the threaded portion of the spoke is not radially oriented.

Referring now to FIG. 11, an aluminum rim 500 and a spoke 502 are illustrated. This wheel corresponds generally with previously described wheels. The rim 500 has a curved spoke bed 504 and a first, bladed portion 506 of the spoke 502 terminates just below the point where the spoke 502 enters the rim. Adjacent to the bladed portion 506, there is an unthreaded portion 508 and the spoke 502 terminates in a threaded portion 510. The spoke 502 passes through a spoke bore indicated at 512 in the rim 500, through a spacer 514 and into an internally threaded nipple 516. The nipple and the spacer cooperate with the spoke bed 504 so that the axis of the unthreaded portion 508 and axis of the threaded portion 510 of the spoke 502 do not coincide with and are not parallel to a radius of the wheel. As the spoke is tightened, the spoke is deformed elastically causing it to take a permanent bend at the point 518, between the bladed portion 506 and the unthreaded portion 508.

Figure 12:
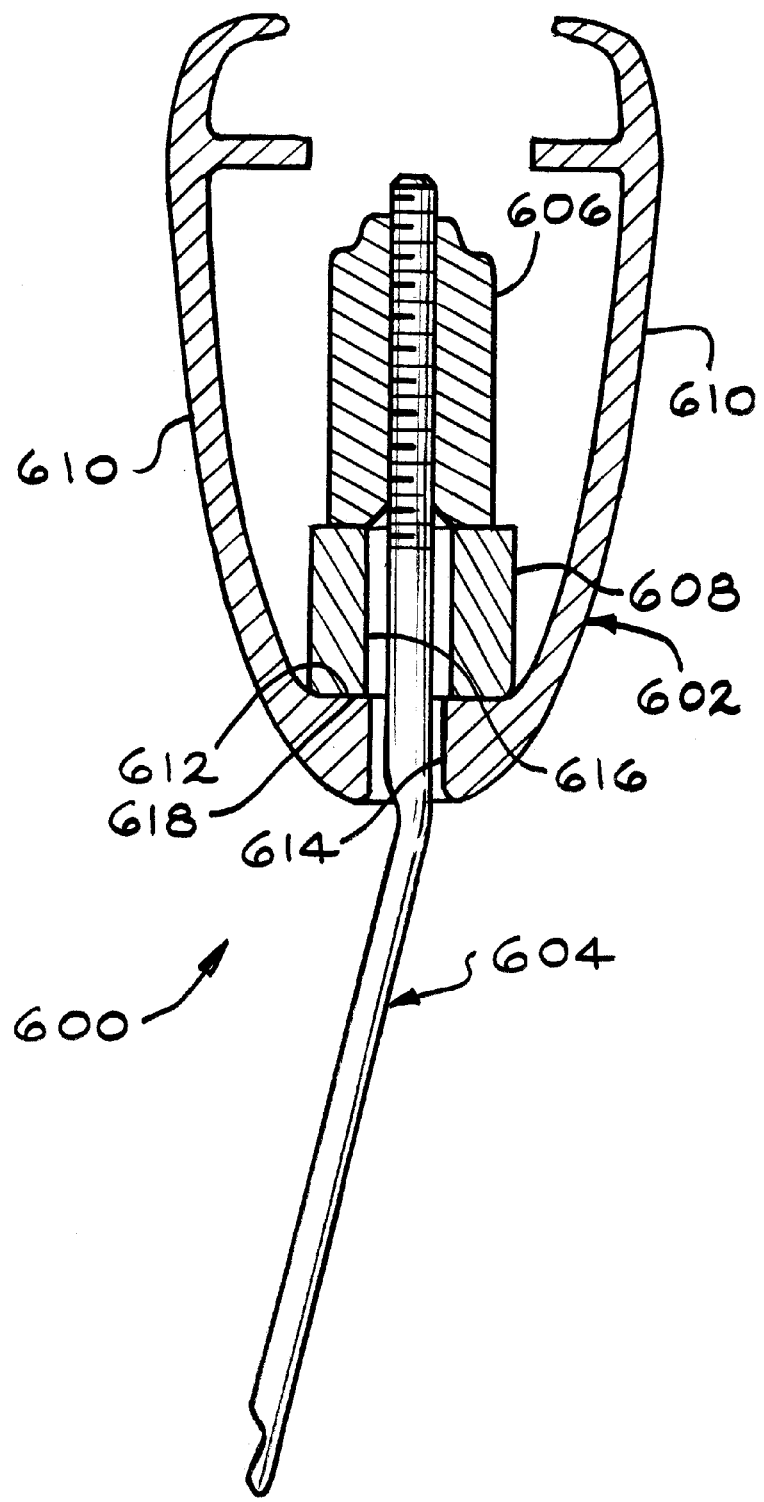
FIG. 12 is a cross sectional view of a portion of a rim including a spoke plate between the nipple and the spoke bed.
Figure 14:
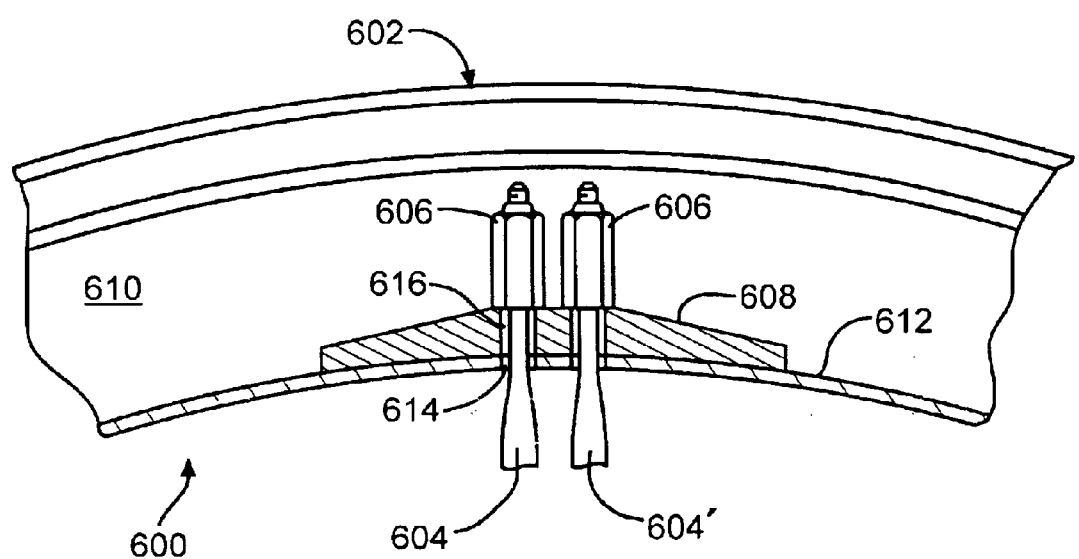
FIG. 14 is a side view, partially in cross section, of a second embodiment of a spoke plate.

Referring now to FIG. 12, a rim portion of a wheel is indicated generally at 600 and comprises a rim 602, a spoke 604, a spoke nipple 606 and a spoke plate 608. The rim 602 comprises side walls 610 and a rim floor 612. The spoke 604 extends through a spoke bore, indicated at 614, in the rim floor 612 and, also, through a spoke bore, indicated at 616 in the spoke plate 608 and into the nipple, which is seated on a substantially flat upper surface of the spoke plate 608. Referring now to FIG. 14, it can be seen that the spoke plate 608 spans two spokes, 604' and extends circumferentially beyond the spokes, 604' a substantial distance. The spokes, 604' are paired together at the rim. One spoke in a pair is attached to a first side of a hub (not shown) and the other spoke in each pair is connected to a second side of a hub, (not shown) such as by a spoke head or by other suitable means. Spoke pairing at the rim is taught in my U.S. Pat. No. 5,931,544 issued Aug. 3, 1999, the disclosure of which is incorporated herein by reference. Excellent results have been achieved where the spokes are paired but circumferentially offset by about 0.30 inch up to about 1.125 inch. The spoke plate 608 has a curvature that matches the curvature of the rim floor 612 and is supported thereon. The spoke nipples 606, in turn, are supported on the spoke plate 608. The spoke plate 608 serves to distribute the load imposed by the spoke nipple 606 over a substantial portion of the rim floor 612, thereby reducing the stresses on the rim floor 612 immediately adjacent to the spoke bore 614. As a consequence, the rim floor 612 can be made thinner and lighter than is possible without the use of a spoke plate 608.

Figure 13:
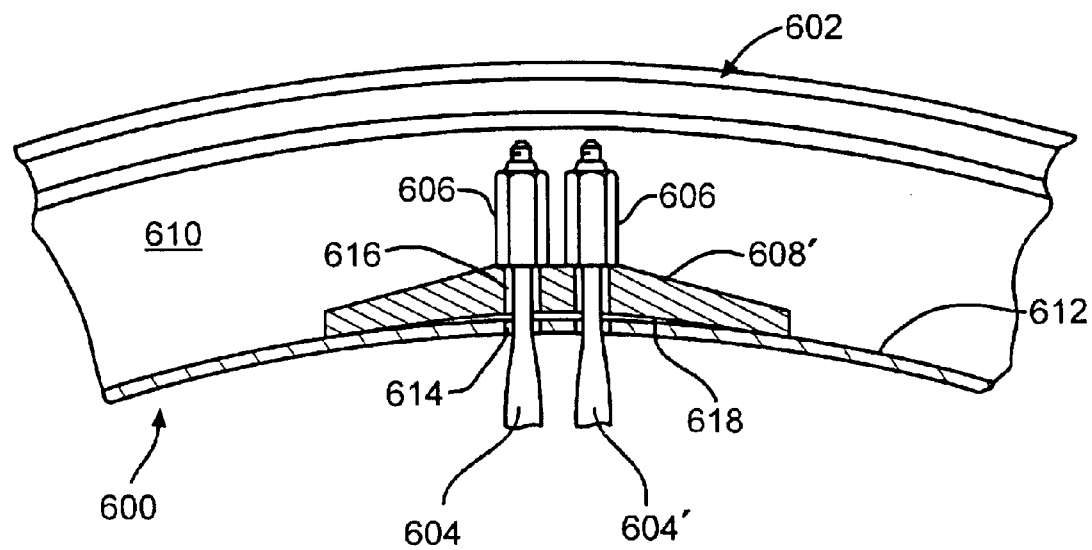
FIG. 13 is a side view, partially in cross section, of a first embodiment of a spoke plate.

As shown in FIG. 14, spoke plate has a lower surface 618 which is in contact with the rim floor 612 over the entire length of the spoke plate 608. This can result from the case where the lower surface 618 of the spoke plate 608 has the same curvature as the rim floor 612. An alternative spoke plate 608' is shown in FIG. 13. The spoke plate 608' has a lower surface 618' which has a smaller radius of curvature than the rim floor 612. The spoke plate 608' is flexible enough that, when the spoke nipples 606 are turned and the spokes 604 are tightened to their final tensions, the spoke plate 608' flexes and assumes the shape shown for the spoke plate 608 shown in FIG. 14. Preferably, the flexibility of the spoke plate 608' is controlled so that, when a pair of spokes 604 are detensioned somewhat, as when the wheel is on a bicycle that is being ridden and a portion of the rim adjacent to the spokes 604 contacts the road, the spoke plate 618' will flex and most of the lower surface 618' will lift up off the rim floor 608, such as shown in FIG. 13, thereby reducing the change in tension that the spokes 604 would undergo in the case where the spoke plate 608' did not flex.

The spoke plate 608 and 608' can function as a spacer to create a bend in a spoke, remote from the intersection between the threaded portion of the spoke and the unthreaded portion, as described above, or simply as a means for distributing loads over a rim floor and reducing stress in the rim immediately adjacent to the spoke bores in the rim.

Figure 15:
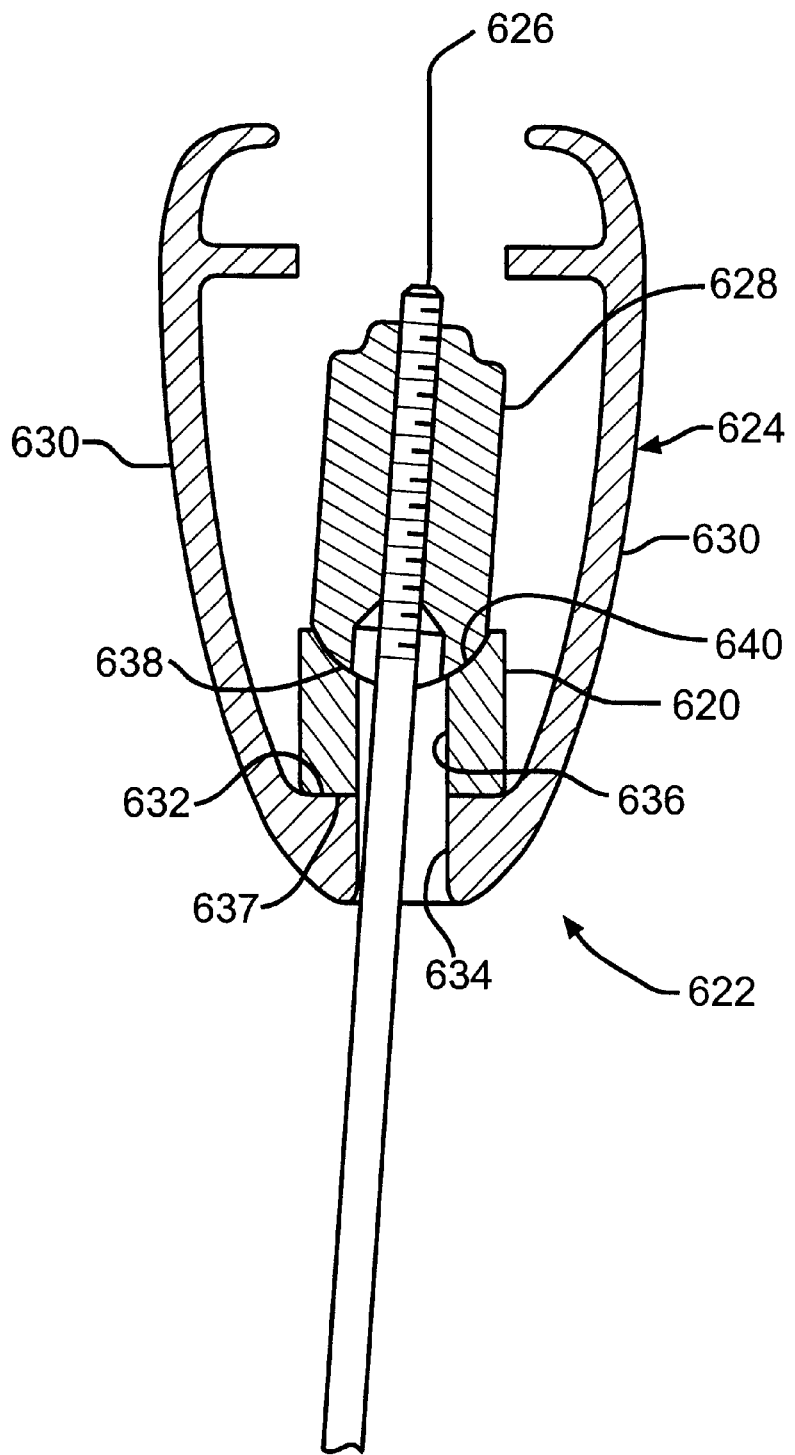
FIG. 15 is a cross sectional view of a portion of a rim including a third embodiment of a spoke plate between the nipple and the spoke bed or rim floor.

A further embodiment of a spoke plate according to the invention is shown in FIG. 15, at 620, in a portion of a wheel indicated generally at 622. The wheel 622 comprises a rim 624, a spoke 626, a spoke nipple 628 and the spoke plate 620. The rim 624 comprises side walls 630 and a rim floor 632. The spoke 626 extends through a spoke bore, indicated at 634, in the rim floor 632 and, also, through a spoke bore, indicated at 636 in the spoke plate 620. Like the previously discussed spoke plates, the spoke plate 620 spans two paired spokes 626 (not shown) and extends circumferentially beyond the spokes 626 a substantial distance in each direction. The spoke plate 620 has a lower surface 637 that can have a curvature that matches the curvature of the rim floor 632, or a curvature with a radius of curvature that is smaller than the radius of curvature of the rim floor 632, as described above. The spoke plate 620 is supported on the rim floor 632. The spoke nipples 628, in turn, are supported on the spoke plate 620. The spoke plate 620 serves to distribute the load imposed by the spoke nipple 628 over a substantial portion of the rim floor 632, thereby reducing the stresses on the rim floor 632 immediately adjacent to the spoke bore 634. As a consequence, the rim floor 6632 can be made thinner and lighter than is possible without the use of a spoke plate 620.

As shown in FIG. 15, the nipple 628 has a lower end 638 that is rounded or ball-shaped and it rests in a socket 640 formed in the upper surface of the spoke plate 620, centered around the spoke bore 636. This construction permits the spoke 626 to be self-aligning and to be capable of realigning itself, as necessary, to eliminate spoke stresses, as taught in my co-pending U.S. patent application, Ser. No. 10/262,312 filed Sep. 30, 2002, the disclosure of which is incorporated herein by reference.

In sum, the present invention involves a method for producing a wheel from a rim, a hub, a plurality of spokes and a plurality of spoke plates for distributing the loads associated with the tensioned spokes over a substantial portion of the rim floor.

The foregoing description is intended to enable one skilled in the art to practice this invention and constitutes the best mode presently known to the inventor for carrying out the invention. Modifications and adaptations of the invention, as described herein, will undoubtedly occur to those skilled in the art and, although not described herein, may nevertheless fall within the spirit and scope of the invention as defined in the claims.

I claim:

1. A wheel comprising
   a hub,
   a rim having a rim floor,
   a given number of tensioned spokes, and a like number of spoke nipples,
      wherein a spoke that is connected to the left side of said hub is paired together, at said rim, with a spoke that is connected to the right side of said hub,
      wherein the wheel further comprises one spoke plate for each pair of spokes,
      wherein each of the spokes in a pair of spokes extend through adjacent spoke bores in said rim, through spoke bores in said spoke plate and into said spoke nipples, and
      wherein said spoke plates are operable to distribute the forces associated with the tensioned spokes over a substantial portion of said rim floor.

2. The wheel claimed in claim 1 wherein said spoke plates each have a lower surface that has a radius of curvature that matches the radius of curvature of said rim floor.

3. The wheel claimed in claim 1 wherein said spoke plates each have a lower surface that has a radius of curvature that is smaller than the radius of curvature of said rim floor.

4. The wheel claimed in claim 3 wherein each spoke plate is flexible to the extent that, when said spokes are fully tensioned, most of said lower surface of said spoke plate is supported on said rim floor.

5. The wheel claimed in claim 1 wherein said spoke plate has a substantially flat upper surface in the vicinity of the spoke bores therethrough, on which said nipples are seated.

6. The wheel claimed in claim 2 wherein said spoke plate has a substantially flat upper surface in the vicinity of the spoke bores therethrough, on which said nipples are seated.

7. The wheel claimed in claim 3 wherein said spoke plate has a substantially flat upper surface in the vicinity of the spoke bores therethrough, on which said nipples are seated.

8. The wheel claimed in claim 4 wherein said spoke plate has a substantially flat upper surface in the vicinity of the spoke bores therethrough, on which said nipples are seated.

9. The wheel claimed in claim 1 wherein said spoke plate has a socket shaped surface centered around each spoke bore therein, wherein said spoke nipples have a ball shaped end and wherein said ball shaped end of said spokes is supported in said socket shaped surfaces in said spoke plates.

10. The wheel claimed in claim 2 wherein said spoke plate has a socket shaped surface centered around each spoke bore therein, wherein said spoke nipples have a ball shaped end and wherein said ball shaped end of said spokes is supported in said socket shaped surfaces in said spoke plates.

11. The wheel claimed in claim 3 wherein said spoke plate has a socket shaped surface centered around each spoke bore therein, wherein said spoke nipples have a ball shaped end and wherein said ball shaped end of said spokes is supported in said socket shaped surfaces in said spoke plates.

12. The wheel claimed in claim 4 wherein said spoke plate has a socket shaped surface centered around each spoke bore therein, wherein said spoke nipples have a ball shaped end and wherein said ball shaped end of said spokes is supported in said socket shaped surfaces in said spoke plates.

* * * * *